US012404023B2

(12) United States Patent
Shoeb et al.

(10) Patent No.: US 12,404,023 B2
(45) Date of Patent: Sep. 2, 2025

(54) VISUAL AND TACTILE CONFIRMATION OF PACKAGE PRESENCE FOR UAV AERIAL DELIVERIES

(71) Applicant: WING Aviation LLC, Mountain View, CA (US)

(72) Inventors: Ali Shoeb, San Rafael, CA (US); Ivan Qiu, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 557 days.

(21) Appl. No.: 17/896,564

(22) Filed: Aug. 26, 2022

(65) Prior Publication Data

US 2024/0067340 A1 Feb. 29, 2024

(51) Int. Cl.
| | |
|---|---|
| *G06V 20/17* | (2022.01) |
| *B64D 1/22* | (2006.01) |
| *B64D 47/08* | (2006.01) |
| *B66D 3/26* | (2006.01) |
| *G05D 1/00* | (2006.01) |
| *G06T 7/10* | (2017.01) |
| *G06T 7/60* | (2017.01) |
| *G06T 7/70* | (2017.01) |
| *B64U 101/64* | (2023.01) |

(52) U.S. Cl.
CPC .............. *B64D 1/22* (2013.01); *B64D 47/08* (2013.01); *B66D 3/26* (2013.01); *G05D 1/101* (2013.01); *G06T 7/10* (2017.01); *G06T 7/60* (2013.01); *G06T 7/70* (2017.01); *G06V 20/17* (2022.01); *B64U 2101/64* (2023.01); *G06T 2207/10032* (2013.01); *G06T 2207/20021* (2013.01)

(58) Field of Classification Search
CPC .. B64D 1/22; B64D 47/08; G06T 7/10; G06T 7/60; G06T 7/70; G06T 2207/20021; G06V 20/17; G06V 10/26; G06V 10/764; G06V 20/70; B64U 2101/64; B64U 2101/30; B64U 2101/67
See application file for complete search history.

(56) References Cited

U.S. PATENT DOCUMENTS

| | | | |
|---|---|---|---|
| 8,223,200 B1 | 7/2012 | Benttine et al. | |
| 10,730,626 B2 | 8/2020 | Gil et al. | |
| 10,885,653 B2 | 1/2021 | Goja et al. | |
| 11,407,511 B1 | 8/2022 | Buchmueller et al. | |

(Continued)

FOREIGN PATENT DOCUMENTS

CN 111587444 A 8/2020

OTHER PUBLICATIONS

Jordan, An Overview of Semantic Image Segmentation, https://www.jeremyjordan.me/semantic-segmentation, May 21, 2018.

(Continued)

*Primary Examiner* — Phuoc Tran
(74) *Attorney, Agent, or Firm* — Christensen O'connor Johnson Kindness PLLC

(57) ABSTRACT

A technique for validating a presence of a package carried by an unmanned aerial vehicle (UAV) includes: capturing an image of a scene below the UAV with a camera mounted to the UAV and oriented to face down from the UAV; analyzing the image to identify whether the package is present in the image; and determining whether the package is attached to the UAV, via a tether extending from an underside of the UAV, based at least on the analyzing of the image.

21 Claims, 6 Drawing Sheets

(56) References Cited

U.S. PATENT DOCUMENTS

| | | |
|---|---|---|
| 2017/0267347 A1 | 9/2017 | Rinaldi et al. |
| 2019/0197646 A1 | 6/2019 | Prager et al. |
| 2020/0207474 A1* | 7/2020 | Foggia ................. G05D 1/0676 |
| 2020/0354083 A1* | 11/2020 | Priest ........................ B64F 1/32 |

OTHER PUBLICATIONS

Image segmentation, Wikipedia Article, https://en.wikipedia.org/w/index.php?title_image-Segmentation&oldid=1098934814, Jul. 18, 2022.

The International Search Report and Written Opinion mailed May 8, 2024, in corresponding PCT Application No. PCT/US2023/027539, 13 pages.

* cited by examiner

VISUAL AND TACTILE CONFIRMATION OF PACKAGE PRESENCE FOR UAV AERIAL DELIVERIES

TECHNICAL FIELD

This disclosure relates generally to unmanned aerial vehicles (UAVs), and in particular, relates to aerial package delivery systems using UAVs.

BACKGROUND INFORMATION

An unmanned vehicle, which may also be referred to as an autonomous vehicle, is a vehicle capable of travel without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including package delivery, exploration/reconnaissance, imaging, public safety, surveillance, or otherwise. The mission definition will often dictate a type of specialized equipment and/or configuration of the unmanned vehicle.

Unmanned aerial vehicles (UAVs), commonly referred to as drones, hold the promise of providing an economical and environmentally friendly delivery service. As these UAVs start delivering packages to, or retrieving packages from, the general public, it will become increasingly important to ensure the correct package is attached to the UAV at the expected times throughout the various segments of an aerial delivery mission. As the public begins to accept aerial delivery services as reliable, the value of the packages entrusted to an aerial delivery service is expected to rise, which in turn places even more emphasis on ensuring packages are correctly attached. Ensuring that an erroneous package is not accepted or delivered is also a safety measure protecting recipient parties. Accordingly, techniques for effectively detecting and validating the presence of a package attached to a UAV providing an aerial delivery service are advantageous.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
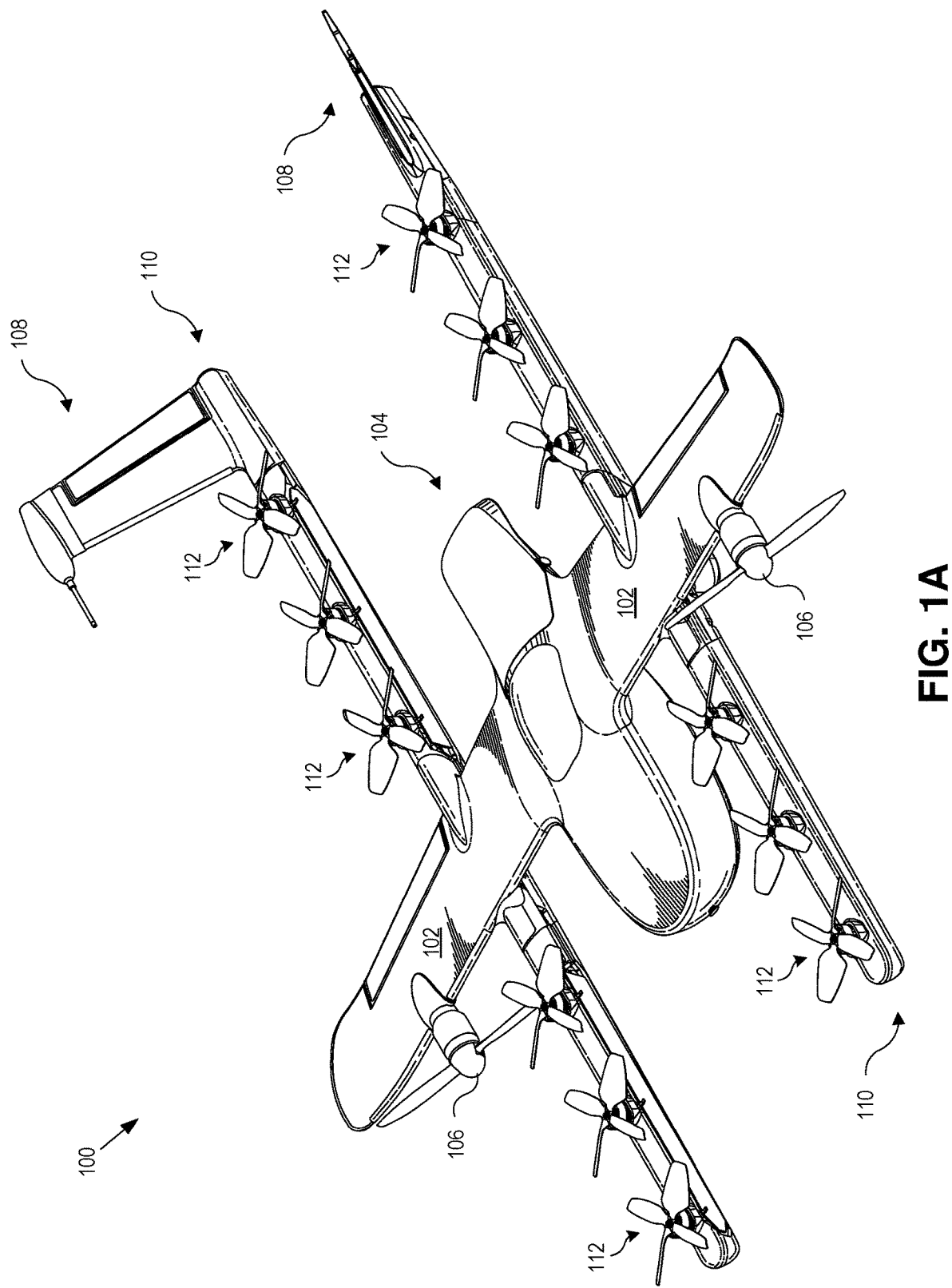
FIG. 1A is a topside perspective view illustration of an unmanned aerial vehicle (UAV) adapted for aerial delivery missions, in accordance with an embodiment of the disclosure.

Embodiments of a system, apparatus, and method for detecting and validating packages attached to an unmanned aerial vehicle (UAV) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein describe techniques for detecting and validating the presence of a package attached to a UAV providing aerial delivery services. Detection and validation of an attached package not only includes determining whether any package is attached, not attached, or fallen off, but may also include ensuring/validating that the package is the correct package, is correctly attached or mounted during flight, and ensuring that the correct package is attached/detached at the appropriate times throughout the various mission segments (e.g., hover segment for pickup, cruise segment enroute to the drop-off destination, hover segment during drop-off, cruise segment on return, and hover segment for landing back at the nest).

The techniques described use a visual perception signal (e.g., machine vision) from capturing an image of a scene below the airframe of the UAV to identify the presence (or lack thereof) of a package. In some embodiments, image segmentation is used to parse the image and tag image pixels deemed to satisfy a package classification (e.g., texture, color, etc. of the pixels are recognizable as a package or box). However, at times the visual perception signal may not be sufficient. In particular, false negatives (i.e., package not recognized) may temporarily arise due to adverse exposure conditions, adverse backgrounds, etc. Accordingly, in various embodiments, the visual perception signal is combined with tactile perception signals from on-board sensors, including winch sensors that monitor operation of a winch that raises and lowers the package on a tether. The tether is dispensed below the UAV during pickups and drop-offs (e.g., hover segments of an aerial delivery mission). For example, these tactile perception signals may include outputs from winch sensors that monitor a length of the tether dispensed, monitor an acceleration of dispensing the tether, monitor a velocity of dispensing the tether, monitor a line tension on the tether, as well as, outputs from other sensors (e.g., GPS, altimeter, anemometer) may be referenced and combined with feedback from the visual perception and tactile perception signals to reduce false negatives and improve overall accuracy of package detection and validation.

These hybrid visual and tactile perception techniques for package detection and validation can help improve the reliability, efficiency, and safety of an aerial delivery service. For example, accurate, real-time package detection/validation can ensure the correct package is picked up at the nest to reduce instances of erroneous packages being delivered. In high wind scenarios, packages can dangle, twist, or lodge into incorrect positions. Package detection/validation can be used to ensure that a picked-up package is correctly attached and cradled to the underbelly of the UAV before embarking on a cruise segment of an aerial delivery mission. While raising or lowering a package at a delivery destination, packages or the tether may catch on ground-based obstructions (e.g., tree branches, wires, etc.). Detecting these errors can help the UAV make remedial flight mission decisions. Upon delivery of a package, a customer may unexpectedly attach a return package to the tether. In these scenarios, an unexpected package should be rejected by releasing the tether so as not to return the unexpected package to the nest. The hybrid visual and tactile perception techniques described herein for package detection/validation can identify these and other scenarios, and provide valuable feedback for making real-time flight mission decisions.

Figure 1B:
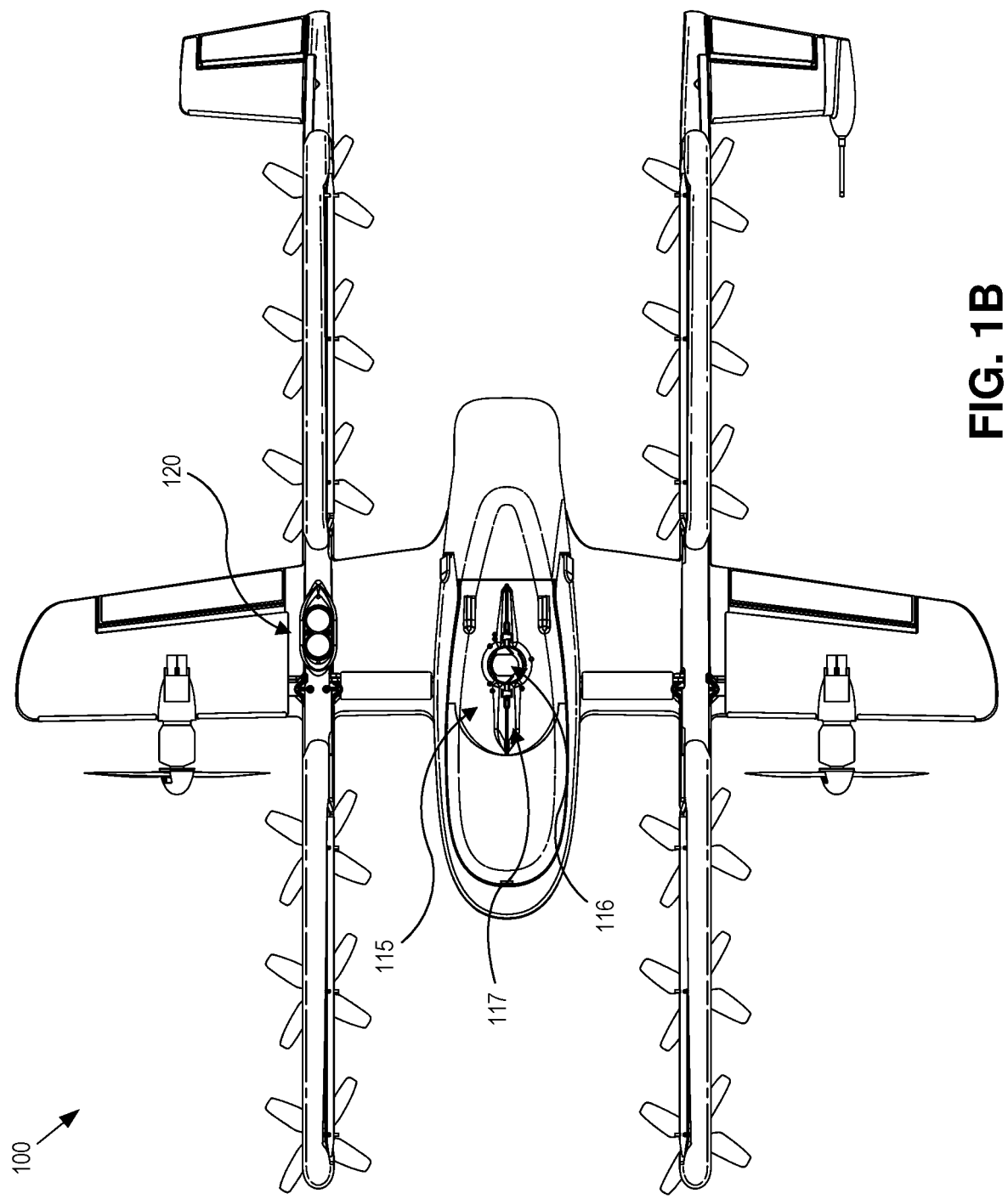
FIG. 1B is a bottom side plan view illustration of a UAV adapted for aerial delivery missions, in accordance with an embodiment of the disclosure.

FIGS. 1A and 1B illustrate a UAV 100 adapted for executing aerial delivery missions, in accordance with an embodiment of the disclosure. FIG. 1A is a topside perspective view illustration of UAV 100 while FIG. 1B is a bottom side plan view of the same.

The illustrated embodiment of UAV 100 is a vertical takeoff and landing (VTOL) UAV that includes separate propulsion units 106 and 112 for providing horizontal and vertical propulsion, respectively. UAV 100 is a fixed-wing aerial vehicle, which as the name implies, has a wing assembly 102 that can generate lift based on the wing shape and the vehicle's forward airspeed when propelled horizontally by propulsion units 106. The illustrated embodiment of UAV 100 has an airframe that includes a fuselage 104 and wing assembly 102. In one embodiment, fuselage 104 is modular and includes a battery module, an avionics module, and a mission payload module. These modules are secured together to form the fuselage or main body.

The battery module (e.g., fore portion of fuselage 104) includes a cavity for housing one or more batteries for powering UAV 100. The avionics module (e.g., aft portion of fuselage 104) houses a control system including flight control circuitry of UAV 100, which may include a processor and memory, communication electronics and antennas (e.g., cellular transceiver, wife transceiver, etc.), and various sensors (e.g., global positioning sensor, an inertial measurement unit, a magnetic compass, a radio frequency identifier reader, etc.). The mission payload module (e.g., middle portion of fuselage 104) houses equipment associated with a mission of UAV 100. For example, the mission payload module may include a winch 115 (see FIG. 2B) for holding and releasing an externally attached payload (e.g., package for delivery) by dispensing a tether comprising a line and end receptacle 116 for attaching to packages. In the illustrated embodiment, end receptacle 116 has a shape that mates into a recess 117 in the underside of UAV 100 to stabilize and cradle the packages during cruise segments.

In some embodiments, the mission payload module may include camera/sensor equipment (e.g., camera, lenses, radar, lidar, pollution monitoring sensors, weather monitoring sensors, scanners, etc.). In FIG. 2B, an onboard camera 120 is mounted to the underside of UAV 100 to support a computer vision system for visual triangulation/navigation and capture images of the scene below UAV 100 for package detection and validation. In some embodiments, camera 120 may also operate as an optical code scanner for reading visual codes affixed to packages. These visual codes may be associated with or otherwise match to delivery missions and provide the UAV with a handle for accessing destination, delivery, and package validation information.

As illustrated, UAV 100 includes horizontal propulsion units 106 positioned on wing assembly 102 for propelling UAV 100 horizontally. UAV 100 further includes two boom assemblies 110 that secure to wing assembly 102. Vertical propulsion units 112 are mounted to boom assemblies 110. Vertical propulsion units 112 providing vertical propulsion. Vertical propulsion units 112 may be used during a hover mode/segment where UAV 100 is descending (e.g., to a delivery location), ascending (e.g., at initial launch or following a delivery), or maintaining a constant altitude. Stabilizers 108 (or tails) may be included with UAV 100 to control pitch and stabilize the aerial vehicle's yaw (left or right turns) during cruise. In some embodiments, during a cruise mode/segment vertical propulsion units 112 are disabled or powered low and during a hover mode/segment horizontal propulsion units 106 are disabled or powered low.

Many variations on the illustrated fixed-wing aerial vehicle are possible. For instance, aerial vehicles with more wings (e.g., an "x-wing" configuration with four wings), are also possible. Although FIGS. 1A and 1B illustrate one wing assembly 102, two boom assemblies 110, two horizontal propulsion units 106, and six vertical propulsion units 112 per boom assembly 110, it should be appreciated that other variants of UAV 100 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2:
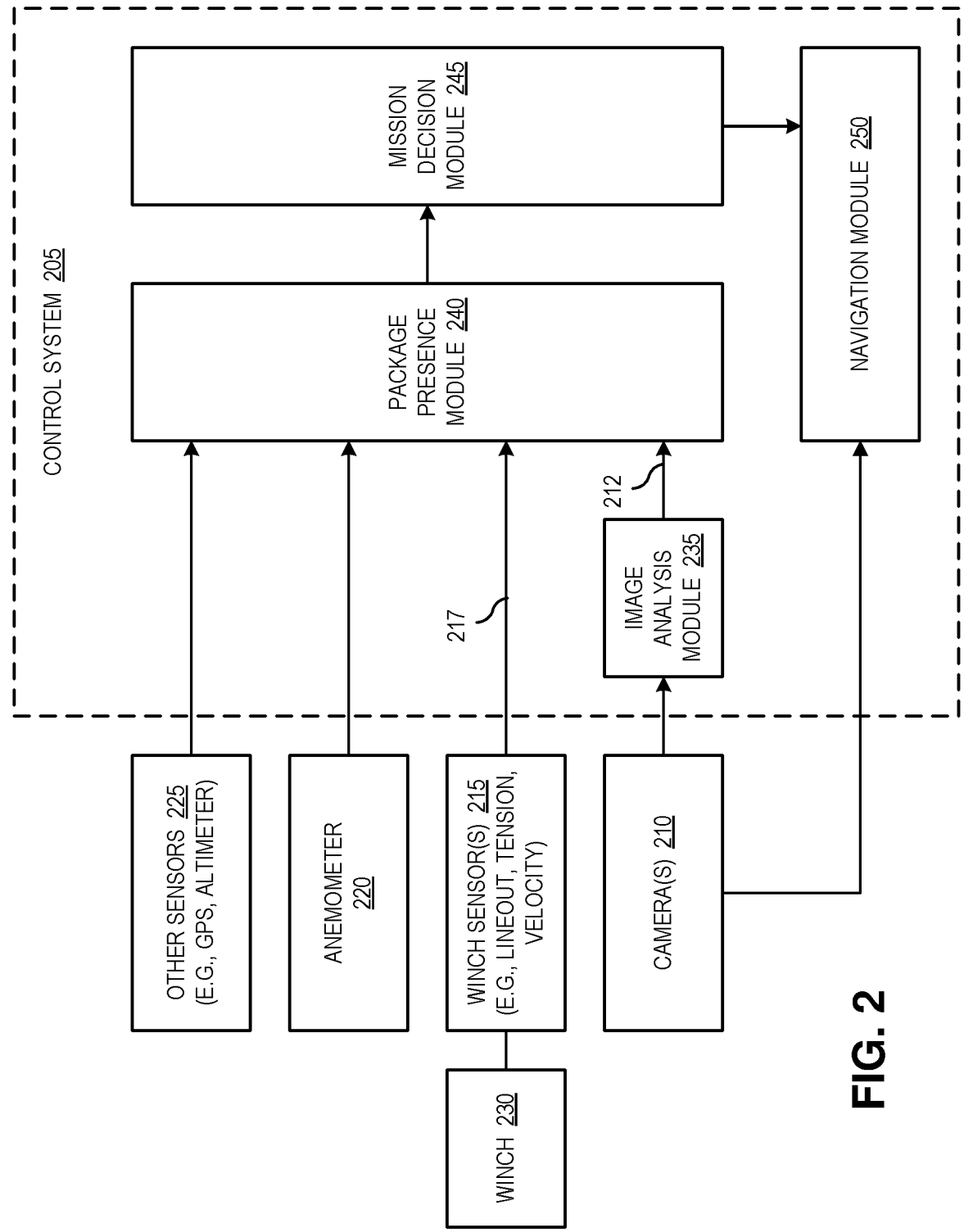
FIG. 2 is a functional block diagram illustrating subsystems of a UAV relevant for detecting and validating the presence of a package, in accordance with an embodiment of the disclosure.

FIG. 2 is a functional block diagram illustrating subsystems of a UAV (e.g., UAV 100) relevant for detecting and validating the presence of a package, in accordance with an embodiment of the disclosure. These subsystems include a control system 205, a camera 210, winch sensors 215, an anemometer 220, other sensors 225, and a winch 230. The illustrated embodiment of control system 205 includes an image analysis module 235, package presence module 240, mission decision module 245, and navigation module 250. Winch 115 and camera 120 illustrated in FIG. 1A are possible implementations of winch 230 and camera(s) 210, respectively.

Winch 230 (or 115) is used to raise and lower packages via dispensing a tether. The packages can be clipped onto the tether at a first end and the other end coils around winch 230, which in turn is mounted to the airframe of UAV 100. Winch 230 enables UAV 100 to retrieve and deliver packages while hovering a few meters above the ground keeping people out of harm's way. Winch sensors 215 may be positioned to monitor operation of winch 230. For example, a rotary encoder, or otherwise, may be used to monitor the length of the tether dispensed. The rotary encoder may also be used to measure and monitor velocity or acceleration of dispensing the tether. Velocity and/or acceleration may be monitored to identify snags or catches of the package during transport. Force feedback sensors or motor current sensors may be used to measure line tension on the tether. Line tension may be monitored as a validation that a package has been attached to the tether, but also to confirm that the correct package has been attached based upon the package weight, and thus the line tension falling within an expected range associated with the expected/correct package weight. The winch sensors 215 may collectively be referred to as tactile sensors that provide a tactile perception of whether a package (or the correct package) is attached to UAV 100.

Camera(s) 210 are mounted to the airframe of UAV 100 and oriented to capture an image of a scene below the airframe. In one embodiment, camera(s) 210 may be implemented as a single camera that is used for both visual detection of packages and visual navigation of UAV 100. In other embodiments, multiple cameras 210 may be mounted to UAV 100 with each independently dedicated to package detection, visual navigation, or other visual tasks.

Image analysis module 235 receives images acquired by camera 210 and analyzes those pictures to identify whether a package is present. In some embodiments, image analysis module 235 may also determine whether the correct package is attached by analyzing size, geometric arrangement (e.g., shape, etc.), color, position, affixed bar codes, or other visual characteristics. In yet other embodiments, image analysis module 235 may also determine whether the package has been correctly attached/stowed for a cruise segment based upon the location of the package in the image.

Figure 4A:
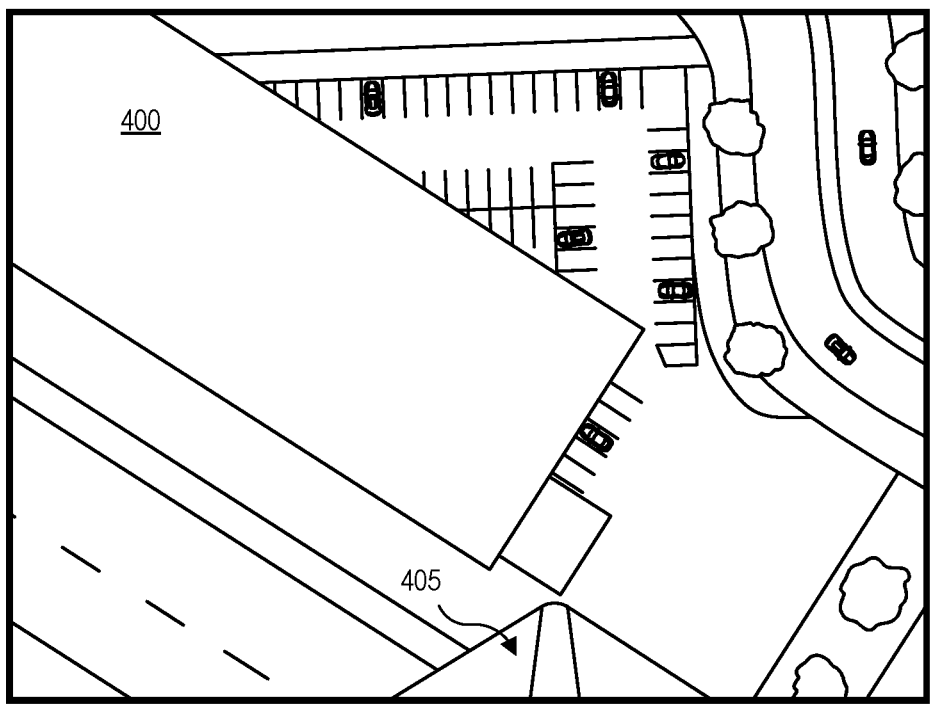
FIG. 4A illustrates an image of a scene below a UAV that includes the presence of a corner of a package in an expected location during a cruise segment of an aerial delivery mission, in accordance with an embodiment of the disclosure.
Figure 4B:
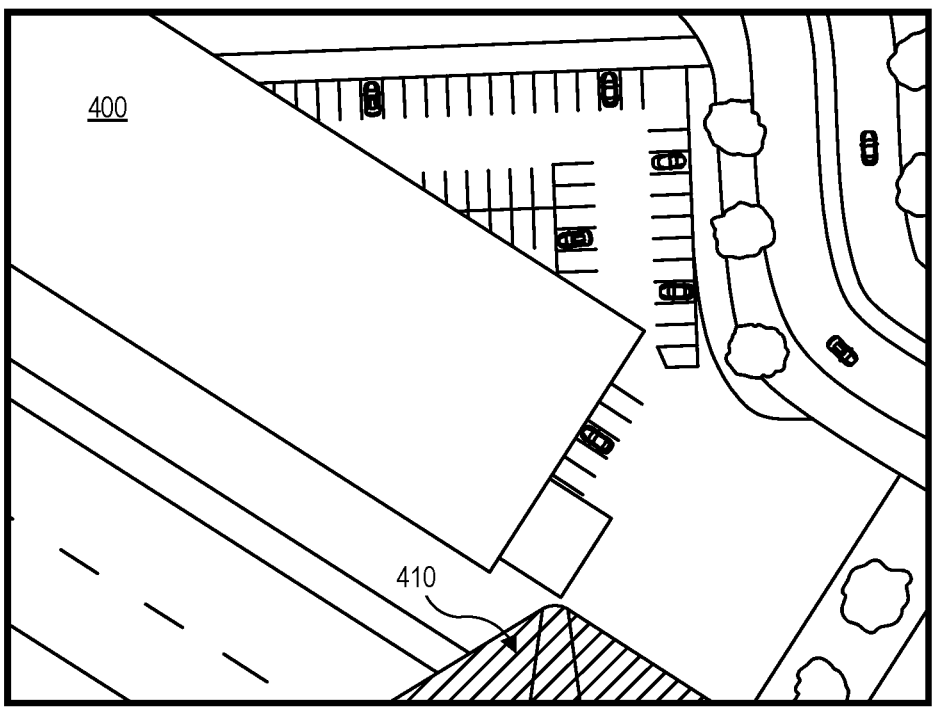
FIG. 4B illustrates how image analysis can be used to determine the presence and location of a package in an image, in accordance with an embodiment of the disclosure.

Image analysis module 235 may be implemented using a variety of different technologies. In one embodiment, image analysis module 235 is a digital image processor that performs "image segmentation" to identify different objects and their respective boundaries in the image. Image segmentation is also referred to as "semantic segmentation" as the individual objects are semantically classified into object categories (e.g., package, tree, building, pole, etc.). Accordingly, the process of image segmentation tags pixels in the image as belonging to a particular classification. In the case of package detection, image analysis module 235 tags pixels that are deemed to satisfy a "package classification." FIG. 4A illustrates an example image 400 of a scene below UAV 100 while UAV 100 is in a cruise segment of its aerial delivery mission enroute to a delivery destination. As can be seen, a package 405 is present in image 400. In fact, just a corner of package 405 extends from a side of the image while a majority of package 405 is out-of-frame of image 400. This is a typical arrangement for package 405 when it is property attached and cradled to UAV 100 enroute to its delivery destination during a cruise segment. FIG. 4B illustrates an image or semantic segmentation that identifies a contiguous group 410 of pixels all tagged as satisfying the package classification.

Figure 4C:
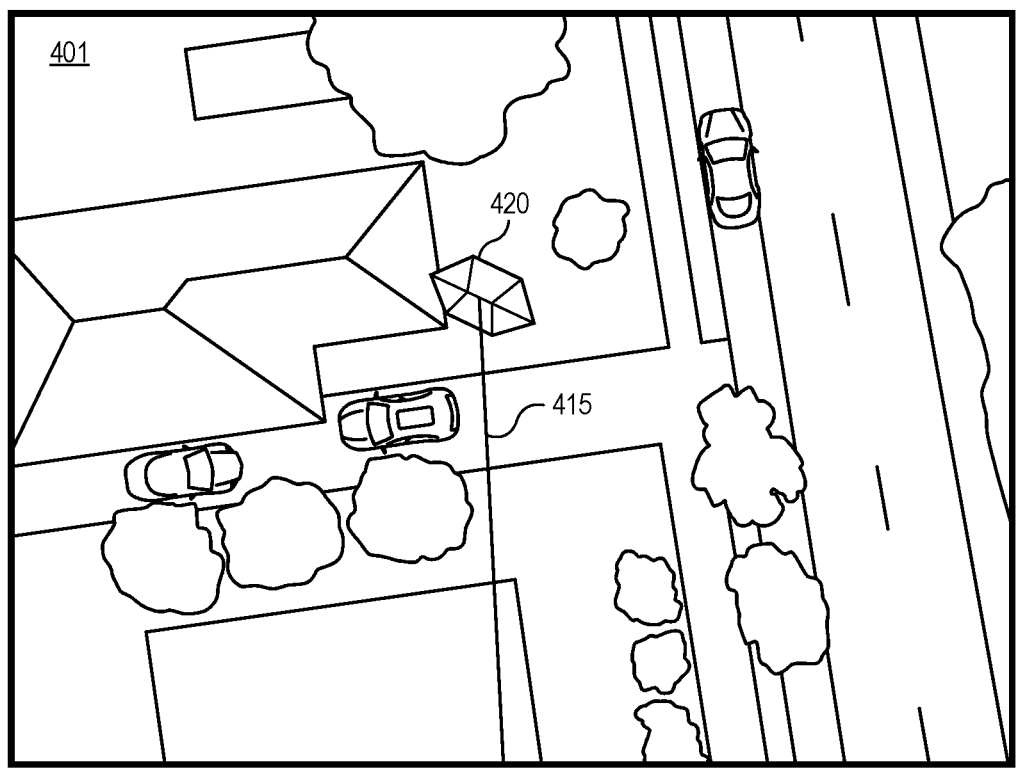
FIG. 4C illustrates how location and threshold number of contiguous pixels in an image can vary based upon a length of a tether and a current mission segment, in accordance with an embodiment of the disclosure.

When a threshold number of contiguous pixels are tagged as being a member of the package classification, then image analysis module 235 determines that a package is viewable in the image. This threshold number may have a variable threshold dependent upon the length of the tether dispensed when the image was acquired. In other words, if the tether is fully recoiled (e.g., see FIGS. 4A and 4B), the threshold number of pixels (e.g., size of contiguous pixels) is different than when the tether 415 is fully extended (e.g., see image 401 in FIG. 4C). Similarly, the identifiable shape and expected position of the contiguous pixels (i.e., the package 420) should be different based on the length of the tether 415 dispensed when the image is acquired. The presence of wind or crosswind is also expected to affect the orientation and position of the package 420 in image 401.

As mentioned, image analysis module 235 may be implemented using a variety of different technologies. In other embodiments, image analysis module 235 may implement a bounding box classification (also referred to as an object detection classification) or otherwise. In one embodiment, image analysis module 235 may be implemented with a neural network or machine learning (ML) classifier trained on a dataset of images that have been previously labeled with ground truth data. In other words, the ML classifier may be trained to perform image segmentation, bounding box classification, or otherwise, as discussed above.

Package presence module 240 receives visual perception data 212 from image analysis module 235 along with tactile perception data 217 from winch sensors 215, and in some embodiments, may also receive sensor data from anemometer 220 and other sensors 225. The other sensors 225 may include a GPS sensor, an altimeter sensor, or otherwise. The other sensor data, anemometer data, tactile perception data 217, and visual perception data 212 may all be analyzed to provide package presence module 240 a wholistic, multi-faceted perception of the immediate environment directly impacting the package to make a more informed decision as to whether a package is presently attached to the tether, whether the correct package is attached, or whether the package is attached in the correct position. Package presence module 240 may be implemented as a heuristic algorithm, a trained ML model, or a combination of both. In the case of a ML model or neural network, sensor data correlated to images from past aerial delivery missions representative of different real world scenarios may be used to train package presence module 240.

Some example scenarios are now described. If UAV 100 currently believes it is holding package 405 and is operating along a cruise segment enroute to delivery, but suddenly the tether experiences rapid acceleration, high velocity, and increasing tether length coupled with a rapidly changing number of pixels satisfying the package classification, then package presence module 240 may deem the package has been snagged and no longer correctly attached. If the shape of the package or the position of the package is not as expected, these deviations may be interpreted as a twisted or faulty attachment of the package. Characteristic patterns of tether length, acceleration, velocity, altimeter, and GPS position relative to pickup/delivery locations present themselves during hover and cruise segments of an aerial delivery mission. Deviations from these characteristic patterns in the visual and/or tactile perception data can be interpreted to represent package errors such as no package, incorrect package, package mounted wrong, etc. In the illustrated embodiment. package presence module 240 is responsible for making these package detection/validation decision based upon the visual perception data 212, tactile perception data 217, and other sensor data.

Mission decision module 245 includes yet another level of logic which uses output from the package presence module 240 to make real-time flight mission decisions. For example, mission decision module 245 may decide to continue on with a mission, if the package presence module 240 determines that the correct package is correctly attached, while it may decide to cancel the mission if any of the above discussed package errors arise. Accordingly, mission decision module 245 understands the various mission segments and when a package is expected to be attached or dropped off in relation to the mission segments. For example, if a package is delivered at a drop-off location while UAV 100 is in a hover segment, but suddenly package presence module 240 detects the presence of a new unexpected package (i.e., the customer removed the delivery package from the tether but then attached a new unexpected package for return, then mission decision module 245 can react accordingly. One such response may be to release the tether and return to the nest without the unexpected package. In this example, unexpected packages are deemed unsafe and not returned to the nest. Similarly, if the package is deemed to be lost unrouted to a delivery destination, mission decision module 245 can make the inflight decision to cancel the aerial delivery mission and return to the nest without flying to the drop-off destination empty handed.

As illustrated, navigation module 250 can take input from cameras 210 and mission decision module 245 to plan and revise routes in real-time. Navigation module 250 may receive input from other sensors 225 using GPS signals for navigation. However, it is also noteworthy that navigation module 250 may also include visual navigation logic to navigate based off the images output from camera(s) 210. In one embodiment, image analysis module 235 and the visual navigation logic share the same camera 210.

Figure 3:
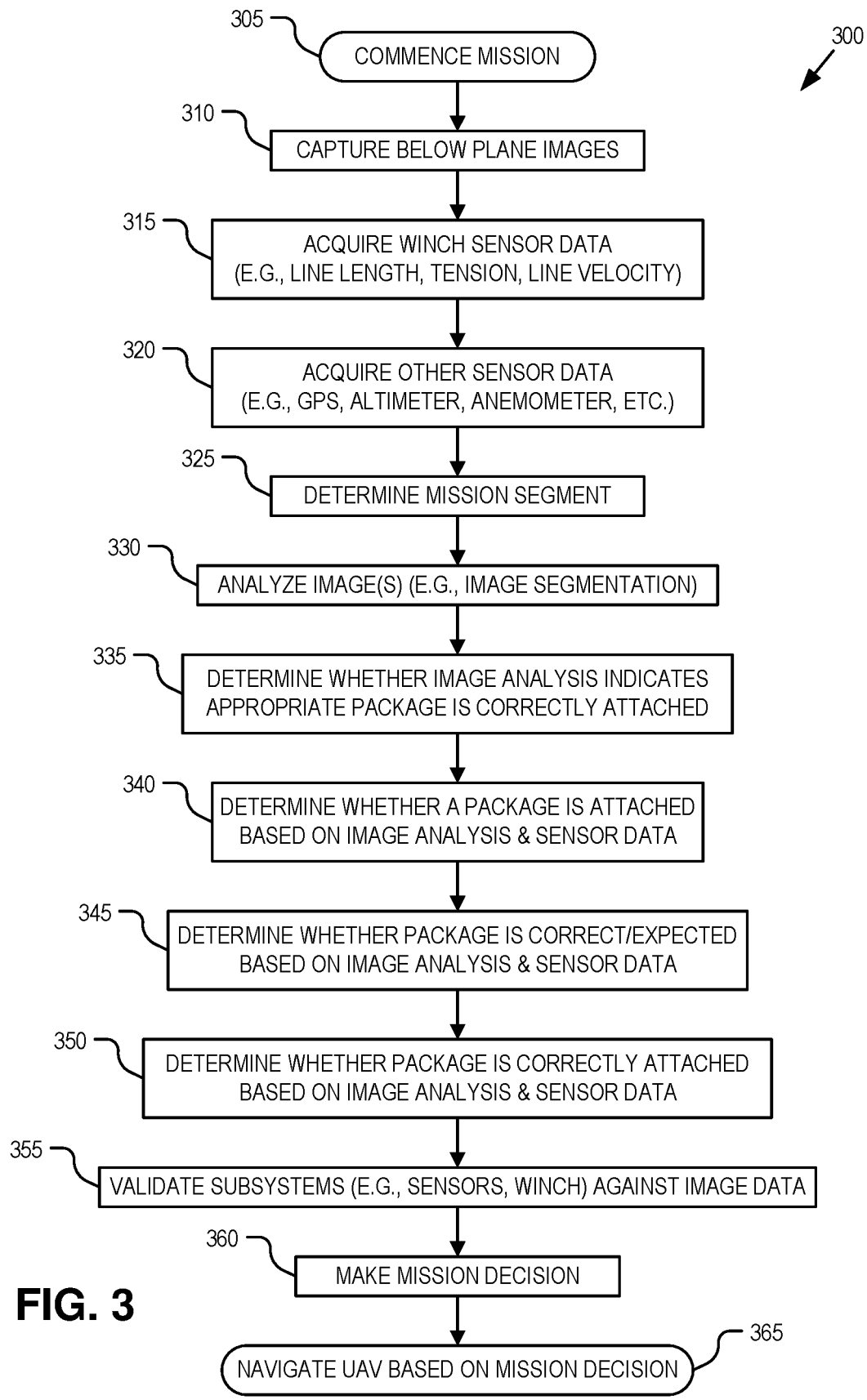
FIG. 3 is a flow chart illustrating a process for detecting and/or validating the presence of a package attached to a UAV using a combination of visual image analysis and tactile feedback from sensors, in accordance with an embodiment of the disclosure.

FIG. 3 is a flow chart illustrating a process 300 for detecting and/or validating the presence of a package attached to UAV 100 using a combination of visual image analysis and tactile feedback from sensors, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Upon commencement of an aerial delivery mission (process block 305), control system 205 begins gathering visual perception data 212 based on images of the scene below UAV 100 (process block 310), tactile perception data 217 from winch sensors 215 (process block 315), and other sensor data from other sensors 225 (process block 320) and analyzing this multifaceted data in the context of its current mission segment. A determination of its current mission segment (decision block 325) may be made based upon GPS data and/or navigation data from navigation module 250.

Image analysis module 235 analyzes the acquired images using image segmentation (process block 330) to determine whether a package is attached (process block 335). Module 235 provides its visual perception determinations based solely on the images acquired by cameras 210 and passes these determinations onto package presence module 240. In addition to package present or not present, the visual perception determinations may also include visual perception determinations of whether the correct package is attached or whether the package is positioned correctly.

Module 240 collects both the visual perception data 212 along with the tactile perception data 217 to make the ultimate determination of whether a package is attached (process block 340), whether the package is the correct package and/or an expected package (process block 345), or whether the package is correctly attached in the expected location (process block 350). Accordingly, module 240 relies upon both types of data along with sensor data from other sensors 225 and/or anemometer 220 to make a more accurate determination with fewer false negatives as to whether a package is present, whether it is the correct/expected package, or whether it is correctly attached to UAV 100.

Visual perception data 212 may also be used as a built-in self-test to validate the other subsystems (process block 355). The package size and position as determined by module 235 using image segmentation on images captured by camera 210 can be used to validate correct operation of winch 230, winch sensors 215, or anemometer 220. For example, the line length measured by a rotary encoder can be validated against the package size measured in the image, which corresponds to a visual estimate of how far the package is from UAV 100 and camera 210. If anemometer 220 measures a certain crosswind, then image analysis along with the current tether length can be used to cross-check whether the package is swinging in the expected direction by an expected amount.

Finally, mission decision module 245 can use the package presence/validation determination output from module 240 along with its knowledge of the current mission segment to make real-time flight mission decisions that can change based upon whether the package is present or not present as expected (process block 360). These flight mission decisions can change the next destination or waypoint, or result in a mission abort (process block 365).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV) adapted for package deliveries, the UAV comprising:
    an airframe adapted for carrying a package;
    a camera mounted to the airframe and oriented to capture an image of a scene below the airframe;
    a tether mounted to the airframe at a first end and adapted to attach the package to the UAV via a second end opposite the first end; and
    a control system coupled to the camera and including logic, that when executed by the control system, causes the UAV to perform operations including:
        capturing the image of the scene below the airframe;
        analyzing the image to classify pixels in the image deemed to satisfy a package classification; and
        determining whether the package is attached to the UAV based at least on whether a threshold number of contiguous pixels in the image are classified into the package classification.

2. The UAV of claim 1, wherein analyzing the image comprises:
    performing an image segmentation on the image; and
    tagging the pixels in the image deemed to satisfy the package classification.

3. The UAV of claim 1, wherein determining whether the package is attached to the UAV further comprises:
    determining whether the threshold number of contiguous pixels classified into the package classification are positioned at an expected location within the image.

4. The UAV of claim 2, wherein determining whether the package is attached to the UAV is further based on at least one of a geometric arrangement of the contiguous pixels in the image or a position of the contiguous pixels in the image.

5. An unmanned aerial vehicle (UAV) adapted for package deliveries, the UAV comprising:
    an airframe adapted for carrying a package;
    a camera mounted to the airframe and oriented to capture an image of a scene below the airframe;
    a tether mounted to the airframe at a first end and adapted to attach the package to the UAV via a second end opposite the first end;
    a winch mounted to the airframe and adapted for raising or lowering the package to or from the UAV via the tether; and
    a control system coupled to the camera and the winch, the control system including logic, that when executed by the control system, causes the UAV to perform operations including:
        capturing the image of the scene below the airframe;
        tracking a length of the tether dispensed by the winch;
        analyzing the image; and
        determining whether the package is attached to the UAV based at least on whether the analyzing indicates that a representation of the package in the image exceeds a threshold, wherein the threshold is variable based on the length of the tether dispensed when the image is acquired.

6. The UAV of claim 5, wherein determining whether the package is attached to the UAV is further based on at least one of an acceleration or a velocity of dispensing the tether.

7. The UAV of claim 5, wherein determining whether the package is attached to the UAV is further based on a line tension on the tether.

8. The UAV of claim 7, wherein determining whether the package is attached to the UAV includes determining whether a correct package is attached to the UAV,
    wherein the control system includes additional logic, that when executed by the control system, causes the UAV to perform additional operations including:
        determining whether the line tension falls within an expected range associated with the correct package.

9. The UAV of claim 5, wherein the control system includes additional logic, that when executed by the control system, causes the UAV to perform additional operations including:
    making a first flight mission decision based upon determining the package is attached to the UAV and the package is expected to be attached to the UAV; and
    making a second flight mission decision, different than the first flight mission decision, based upon determining the package is attached to the UAV and the package is not expected to be attached to the UAV.

10. The UAV of claim 9, wherein the second flight mission decision comprises releasing the tether from the UAV.

11. The UAV of claim 5, wherein analyzing the image to identify whether the package is present in the image comprises:
    performing an image segmentation on the image;
    tagging pixels in the image deemed to satisfy a package classification; and
    determining the package is viewable in the image of the scene below the airframe based at least on whether a threshold number of contiguous pixels in the image are tagged as satisfying the package classification,
    wherein the threshold number of contiguous pixels is a variable threshold dependent upon the length of the tether dispensed when the image is acquired.

12. The UAV of claim 5, wherein the control system includes additional logic, that when executed by the control system, causes the UAV to perform additional operations including:
    analyzing the image to estimate how far the package is from the UAV; and
    validating correct operation of the winch or winch sensors that monitor operation of the winch based at least on the image and the estimate.

13. The UAV of claim 1, wherein the control system includes additional logic, that when executed by the control system, causes the UAV to perform additional operations including:
    generating navigation decisions for the UAV based at least upon the image of the scene below the airframe acquired by the camera,
    wherein visual navigation and package presence decisions are both based upon images acquired by the camera.

14. A method of validating a presence of a package carried by an unmanned aerial vehicle (UAV), the method comprising:
    capturing an image of a scene below the UAV with a camera mounted to the UAV and oriented to face down from the UAV;

analyzing the image to classify pixels in the image deemed to satisfy a package classification; and determining whether the package is attached to the UAV via a tether extending from an underside of the UAV, based at least on whether a threshold number of contiguous pixels in the image are classified into the package classification.

15. The method of claim 14, wherein determining whether the package is attached to the UAV includes determining whether a corner of the package extends from a side of the image while a majority of the package is out-of-frame of the image when the UAV is operating in a cruise segment of an aerial delivery mission.

16. The method of claim 14, wherein analyzing the image comprises:

performing an image segmentation on the image; and tagging the pixels in the image deemed to satisfy the package classification.

17. The method of claim 14, wherein determining whether the package is attached to the UAV further comprises:

determining whether the threshold number of contiguous pixels classified into the package classification are positioned at an expected location within the image, the expected location changing dependent upon a mission segment of an aerial delivery mission flown by the UAV.

18. The method of claim 14, further comprising:

raising or lowering the package via a winch coupled to the tether; and tracking a length of the tether dispensed by the winch, wherein determining whether the package is attached to the UAV is based at least on the analyzing of the image and the length of the tether dispensed when the image is acquired.

19. The method of claim 18, wherein determining whether the package is attached to the UAV is further based on at least one of an acceleration of dispensing the tether, a velocity of dispensing the tether, or a line tension on the tether.

20. The method of claim 14, wherein determining whether the package is attached to the UAV includes determining whether a correct package is attached to the UAV, the method further comprising:

determining whether a line tension of the tether falls within an expected range associated with the correct package.

21. A method of validating a presence of a package carried by an unmanned aerial vehicle (UAV), the method comprising:

capturing an image of a scene below the UAV with a camera mounted to the UAV and oriented to face down from the UAV;

analyzing the image to identify whether the package is present in the image;

determining whether the package is attached to the UAV, via a tether extending from an underside of the UAV, based at least on the analyzing of the image; and releasing the tether when determining that an incorrect package or unexpected package has been attached to the UAV after delivering the package to a destination.

* * * * *